United States Patent
Chen

(10) Patent No.: US 9,380,183 B2
(45) Date of Patent: Jun. 28, 2016

(54) IMAGE SENSING DEVICE

(71) Applicant: AVISION INC., Hsinchu (TW)

(72) Inventor: Yen-Cheng Chen, Hsinchu (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 14/878,275

(22) Filed: Oct. 8, 2015

(65) Prior Publication Data

US 2016/0112595 A1    Apr. 21, 2016

(30) Foreign Application Priority Data

Oct. 21, 2014 (TW) .............................. 103136290 A

(51) Int. Cl.
*H04N 1/04* (2006.01)
*H04N 1/028* (2006.01)
(Continued)

(52) U.S. Cl.
CPC ........... *H04N 1/028* (2013.01); *H04N 1/02409* (2013.01); *H04N 1/0458* (2013.01); *H04N 1/46* (2013.01)

(58) Field of Classification Search
CPC .............. H04N 9/045; H04N 1/40056; H04N 2201/0081; H04N 3/1581; H04N 5/23296; H04N 1/00; H04N 1/0303; H04N 1/56; H04N 5/3692; H04N 1/03; H04N 1/04; H04N 1/19; H04N 1/203; G06F 3/0412; G06F 3/042

USPC ......... 358/1.9, 448, 518, 1.13, 452, 474, 504, 358/1.1, 1.2, 2.1, 3.23, 447, 453, 461, 462, 358/475, 482, 483, 484, 497, 505, 512, 513, 358/514, 530, 540; 382/167, 103, 106, 110, 382/141, 176, 254

See application file for complete search history.

(56) References Cited

U.S. PATENT DOCUMENTS 6,307,661 B1 * 10/2001 Fujibayashi ........... G02B 13/24
    358/474
6,917,028 B2 * 7/2005 Hiromatsu ......... H04N 1/02865
    250/208.1

(Continued)

*Primary Examiner* — Negussie Worku

(57) ABSTRACT

An image sensing device includes N red light sensing units, N green light sensing units, N blue light sensing units and a control circuit. The control circuit accumulates an exposure capacity $Q_i$ generated by the $i^{th}$ red light sensing unit, green light sensing unit, and blue light sensing unit in an exposure time $T_i$ and an exposure capacity $Q_{i+1}$ generated by the $(i+1)^{th}$ red light sensing unit, green light sensing unit, and blue light sensing unit in next exposure time $T_{i+1}$ until an exposure capacity $Q_N$ generated in the $T_N^{th}$ exposure time is accumulated, wherein i is an integer ranging from 1 to N. The exposure capacities $Q_i$ to $Q_N$ are sequentially stored in a register and outputted from the control circuit, so that the image of each scan line can be sequentially transferred to an analog signal with the sum of the exposure capacities $Q_i$ to $Q_N$.

10 Claims, 3 Drawing Sheets

(51) Int. Cl.
*H04N 1/024* (2006.01)
*H04N 1/46* (2006.01)

(56) References Cited

U.S. PATENT DOCUMENTS

| | | | |
|---|---|---|---|
| 7,471,426 B2 * | 12/2008 | Ide | H04N 1/401 250/208.1 |
| 7,551,328 B2 * | 6/2009 | Kondo | H04N 1/028 340/937 |
| 7,564,597 B2 | 7/2009 | Chueh | |
| 8,274,716 B2 * | 9/2012 | Sugiyama | H04N 1/0473 358/463 |
| 8,542,401 B2 * | 9/2013 | Hanawa | H04N 1/3871 358/1.9 |
| 8,705,153 B2 * | 4/2014 | Ishido | H04N 1/401 358/474 |
| 8,760,529 B2 * | 6/2014 | Okada | H04N 5/3742 348/221.1 |
| 8,941,898 B2 * | 1/2015 | Onishi | H01L 27/14605 250/205 |
| 2003/0007816 A1 * | 1/2003 | Ishimaru | H04N 1/00795 399/367 |

* cited by examiner

IMAGE SENSING DEVICE

This application claims the benefit of Taiwan application Serial No. 103136290, filed Oct. 21, 2014, the subject matter of which is incorporated herein by reference.

BACKGROUND OF THE INVENTION

1. Field of the Invention

The invention relates in general to an image sensing device and more particularly to an image sensing device used for scanning a document.

2. Description of the Related Art

Referring to FIG. 1, a schematic diagram of an optical path shows a sensing unit module 118 senses the image of a document 112. The sensing unit module 118 has a long strip shape, and includes 3 sensing units, R, G, and B. Each sensing unit is capable of sensing a scan line 122 on the scan document 112 in an X-axis direction. The resolution in the X-axis direction is referred as "optical resolution", and dpi represents a dot number of light sensing elements covered by each sensing unit projected from every inch of document. Moreover, since a machine or a scan document 112 is driven by a step motor to transmit in a Y-axis direction, a sensing unit module 118 can sense a plurality of scan lines 122 on the scan document 112. The resolution in the Y-axis direction is referred as "mechanical resolution", which represents step number by which the sensing unit module 118 is transmitted per inch of the step motor. Therefore, the resolution of the scanner is normally represented by (X-axis resolution×Y-axis resolution) dpi, such as 600×300 dpi.

After the 3 sensing units R, G, and B sense 3 adjacent scan lines Ln, Ln+1 and Ln+2 respectively through a lens set 116, the step motor drives the sensing unit module 118 to the next step along the Y-axis (dotted lines of FIG. 1), the sensing units exactly sense next 3 adjacent scan lines Ln+1, Ln+2 and Ln+3. Therefore, the image of each scan line 122 is sensed by corresponding sensing units R, G, and B, and a complete color image can thus be obtained.

Let the step motor used in a scanner whose Y-axis resolution is 300 dpi be taken for example. When the Y-axis resolution is increased to 600 dpi, in order to maintain the same scan speed, a number of scan lines per page needs to be doubled, making the scan time per scan line halved. Since the exposure time of each sensing unit is halved, the exposure capacity will become insufficient.

SUMMARY OF THE INVENTION

The invention is related to an image sensing device, which accumulates exposure capacity so as to resolve the problem of the exposure time being shortened in the prior art.

According to an aspect of the present invention, an image sensing device is disclosed. The image sensing device is disposed on a transmission path of an illumination beam and pleural scan lines are formed on a scan document by the illumination beam. The image sensing device sequentially senses the scan lines to correspondingly output pleural analog signals. The image sensing device includes N red light sensing units, N green light sensing units, N blue light sensing units and a control circuit. The control circuit accumulates an exposure capacity $Q_i$ generated by each of the red, the green, and the blue light sensing units in an exposure time Ti and an exposure capacity $Q_{i+1}$ generated by each of the red, the green, and the blue light sensing units in next exposure time $T_{i+1}$ until an exposure capacity $Q_N$ generated in the $T_N^{th}$ exposure time is accumulated, wherein i is an integer ranging from 1 to N. The exposure capacities $Q_i$ to $Q_N$ are sequentially stored in a register and outputted from the control circuit, so that the image of each scan line can be sequentially transferred to an analog signal with the sum of the exposure capacities $Q_i$ to $Q_N$.

The above and other aspects of the invention will become better understood with regard to the following detailed description of the preferred but non-limiting embodiment(s). The following description is made with reference to the accompanying drawings.

DETAILED DESCRIPTION OF THE INVENTION

An exemplary example of the present embodiment discloses an image sensing device additionally having at least one set of red, green, and blue light sensing unit. A lens set is disposed to adaptively match the image sensing device, so that the number of scan lines that the sensing unit module can sense along a Y-axis direction within the same exposure time is at least doubled. The scan resolution can be effectively increased without having to improve the step motor or increasing the brightness of the tube.

Figure 1:
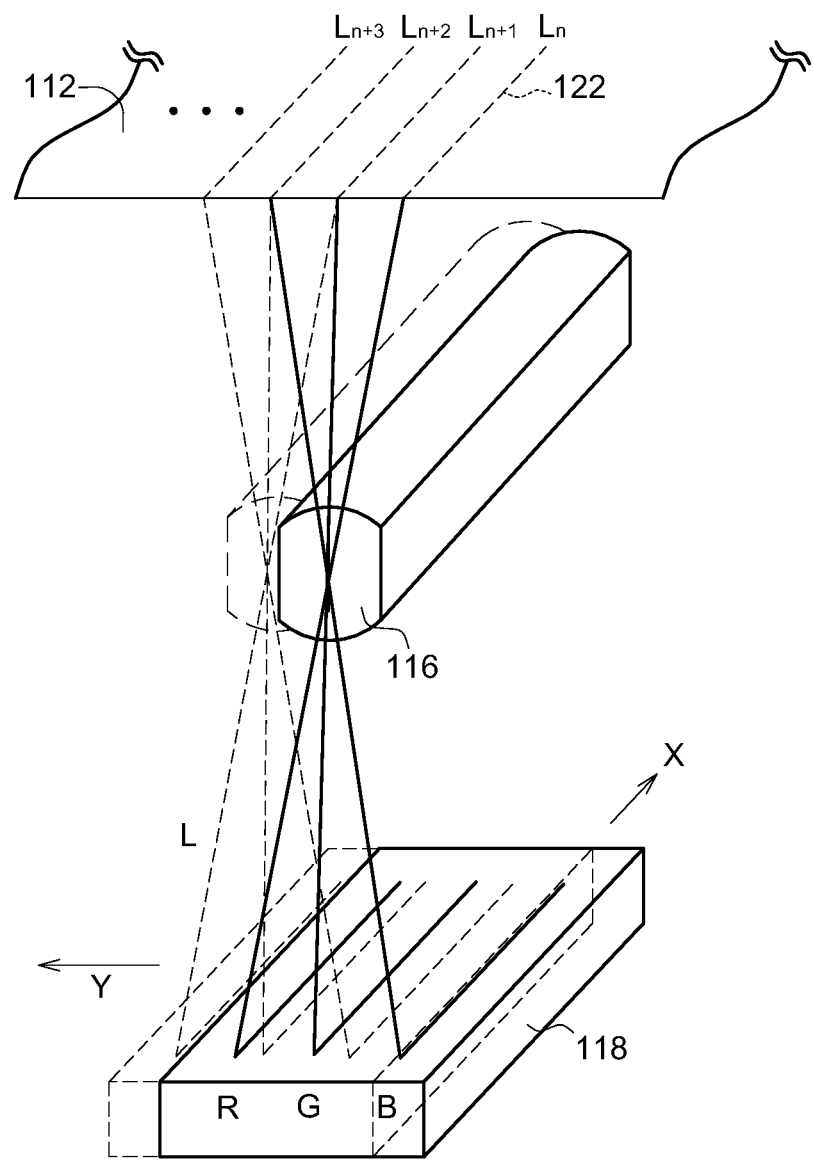
FIG. 1 is a schematic diagram of an optical path representing a sensing unit module sensing a document.
Figure 2:
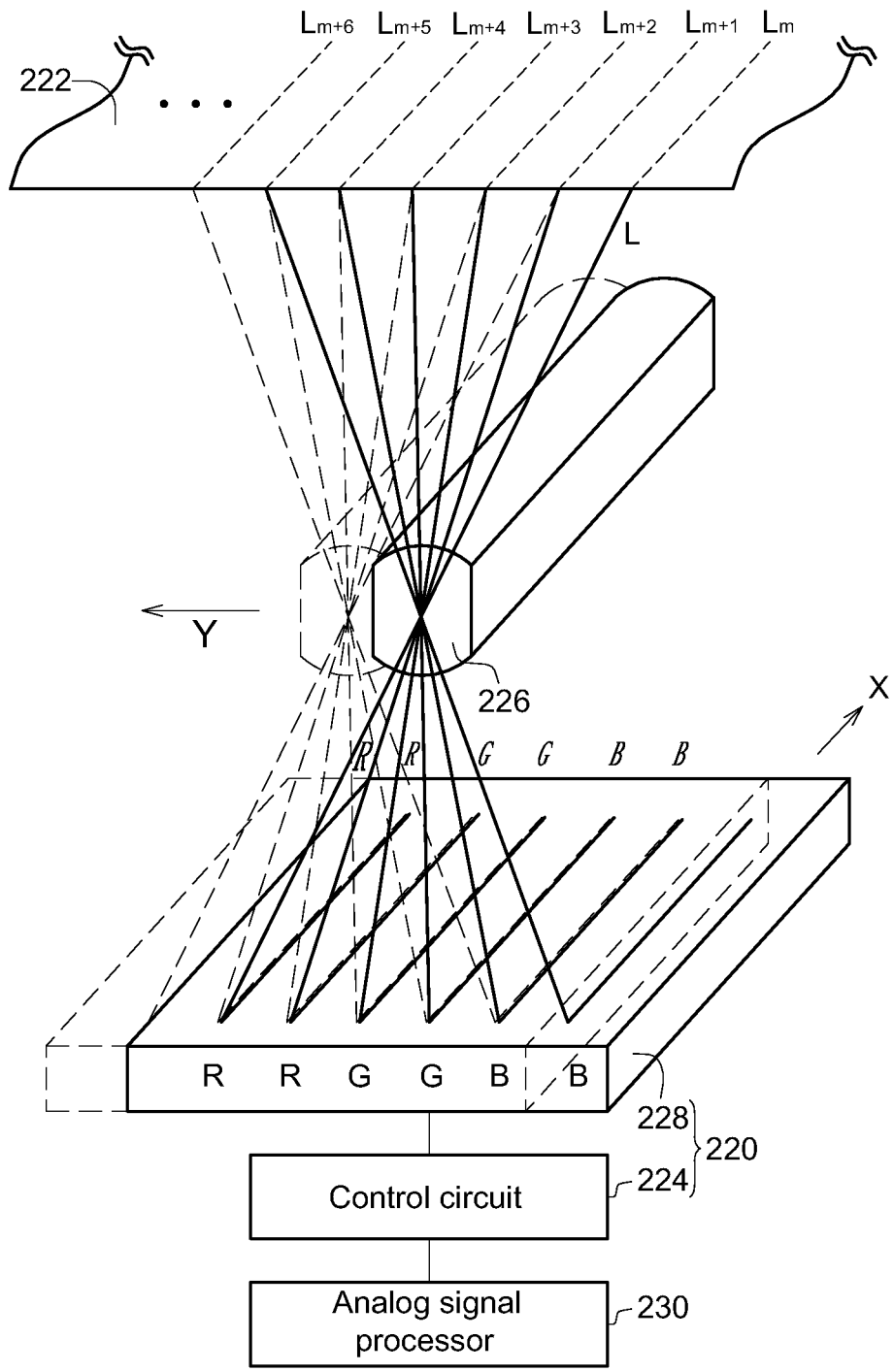
FIG. 2 is a schematic diagram of an optical path representing a sensing unit module senses a scan document according to an embodiment of the invention.

Referring to FIG. 2, a schematic diagram of an optical path along which an image sensing device 220 senses a scan document 222 according to an embodiment of the invention. The image sensing device 220 can be installed in a scan module (such as a scanner). The scan module includes a motor (such as a step motor) used for driving the image sensing device 220 or the scan document 222, so that the image sensing device 220 and the scan document 222 generate relative movement. Although no illumination source used for scanning purpose is illustrated in FIG. 2, it is understood that an illumination source can be disposed in the scan module to generate an illumination beam L for scanning purpose. The image sensing device 220 is disposed on the transmission path of the illumination beam L and pleural scan lines are formed on the scan document 222 by the illumination beam L, and sequentially senses the scan lines to correspondingly output pleural analog signals.

According to an embodiment of the invention, the sensing unit module 228 is improved to increase the resolution in the Y-axis direction and the exposure capacity without having to change the rotation speed of the motor or the brightness of the tube. Refer to FIG. 2. Let a charge couple device (CCD) be taken for example. The sensing unit module 228 includes 6 sensing units RCCD, RCCD, GCCD, GCCD, BCCD, and BCCD. In comparison to the prior art, the sensing unit module 228 of the invention additionally includes a CCD set of RCCD, GCCD, and BCCD, and is capable of sensing 6 adjacent scan lines Lm, Lm+1, Lm+2, Lm+3, Lm+4 and Lm+5 at the same time. Moreover, the 6 CCDs collaborates with a lens set 226, so that the number of scan lines sensed per inch of the scan document in the present embodiment is twice as many as in the prior art (that is, the Y-axis resolution of the present embodiment is twice as many as the prior), and the resolution in the Y-axis direction is thus increased. Besides, when the sensing unit module 228 is driven by the step motor to transmit along the Y-axis, the sensing unit module 228 will be moved forward by 1 scan line each time the sensing unit module 228 is transmitted by 1 step. That is, the next 6 scan lines (indicated by dotted lines in FIG. 2) to be sensed by the sensing unit module 228 are scan lines Lm+1, Lm+2, Lm+3, Lm+4, Lm+5 and Lm+6, and the next step can be obtained by the same analogy. The RGB images of each scan line are respectively sensed by 6 adjacent sensing units RCCD, RCCD, GCCD, GCCD, BCCD, and BCCD, and the exposure capacities of the RGB images of each scan line are accumulated in two exposure times and become twice the exposure capacity obtained in one single exposure time. Therefore, the exposure capacity of the color image obtained by mixing the RGB images can be increased.

Refer to FIG. 2. The control circuit 224 accumulates an exposure capacity $Q_i$ generated by the $i^{th}$ red light sensing unit R, the $i^{th}$ green light sensing unit G and the $i^{th}$ blue light sensing unit B in an exposure time Ti and an exposure capacity $Q_{i+1}$ generated by the $(i+1)^{th}$ red light sensing unit R, the $(i+1)^{th}$ green light sensing unit G and the $(i+1)^{th}$ blue light sensing unit B in next exposure time $T_{i+1}$ until an exposure capacity $Q_N$ generated in the $T_N^{th}$ exposure time is accumulated, wherein i is an integer ranging from 1 to N, and N is the number of corresponding red light sensing units, green light sensing units and blue light sensing units. The exposure capacities $Q_i$ to $Q_N$ are sequentially stored in a register (such as CCD shift register) and accumulated by an adder of the control circuit 224, and then are outputted to an analog signal processor 230, so that the image of each scan line can be sequentially transferred to an analog signal with the sum of the exposure capacities $Q_i$ to $Q_N$.

Suppose there are N red light sensing units, N green light sensing units and N blue light sensing units. Given that the rotation speed of the motor remains unchanged, the present embodiment is capable of increasing the exposure capacity to N times, such that the brightness can be increased, and total brightness values outputted from the N red light sensing units, the N green light sensing units, and the N blue light sensing units respectively are N times of the brightness values outputted from singular red light sensing unit, singular green light sensing unit, and singular blue light sensing unit. Moreover, given that the rotation speed of the motor remains unchanged, the present embodiment is capable of increasing the resolution in the Y-axis direction to N times, such that the scan resolutions of the N red light sensing units, the N green light sensing units, and the N blue light sensing units in the Y-axis direction respectively are N times of the scan resolutions of singular red light sensing unit, singular green light sensing unit, and singular blue light sensing unit in the Y-axis direction.

The 6 CCD sensing unit modules 228 can be arranged as a combination of 2 RCCD, 2 GCCD and 2 BCCD. Apart from the arrangement (RCCD, RCCD, GCCD, GCCD, BCCD, BCCD), the 6 CCD sensing unit modules 228 can also be arranged as (RCCD, RCCD, BCCD, BCCD, GCCD, GCCD) or (GCCD, GCCD, RCCD, RCCD, BCCD, BCCD). Or, the arrangement of the 6 CCD sensing unit modules 228 can be divided into two parts: the first part is a combination of RCCD, GCCD, BCCD, and the second part is a duplication of the first part. For example, the 6 CCD sensing unit modules 228 can be arranged as (RCCD, GCCD, BCCD, RCCD, GCCD, BCCD) or (RCCD, BCCD, GCCD, RCCD, BCCD, GCCD). Or, the arrangement of the 6 CCD sensing unit modules 228 can also be divided into two parts: the first part is a combination of RCCD, GCCD, BCCD, and the second part is a mapping of the first part. For example, the 6 CCD sensing unit modules 228 can be arranged as (RCCD, GCCD, BCCD, BCCD, GCCD, RCCD) or (BCCD, RCCD, GCCD, GCCD, RCCD, BCCD). According to these arrangements, the light reflected from 3 consecutive sensing actions can be sensed by the RCCD, GCCD and BCCD on the same scan line to obtain a complete color image, and the exposure capacity is twice of the prior art.

Besides, if the scan speed needs to be doubled in order to remain the resolution in the Y-axis direction and the exposure capacity unchanged, then the sensing unit needs to be transmitted by 2 scan lines each time the sensing unit is driven by the step motor to transmit by 1 step. By doing so, the resolution and the exposure capacity will remain unchanged, and the scan quality will not change. As the scan speed is increased, the scan time will be reduced accordingly.

Although the sensing unit is exemplified by a charge couple device (CCD) in above embodiments, the sensing unit can also be realized by a contact image sensor (CIS) or a complementary metal oxide semiconductor (CMOS) element, and is still within the scope of protection of the invention. Moreover, the sensing unit of above embodiments is preferably realized by a time delay integration (TDI) sensor for storing signal charges to the CCD shift register. Also, the signal charges stored in the CCD shift register can be accumulated by an adder to calculate the exposure capacity of each scan line.

Therefore, when the above red light sensing units, green light sensing units and blue light sensing units are exposed by an illumination beam L and respectively generate corresponding signal charges, the signal charges are controlled by a shift gate and sequentially outputted to a CCD shift register for the control circuit 224 to calculate the exposure capacity generated by each red light sensing unit R, each green light sensing unit G and each blue light sensing unit B.

Figure 3:
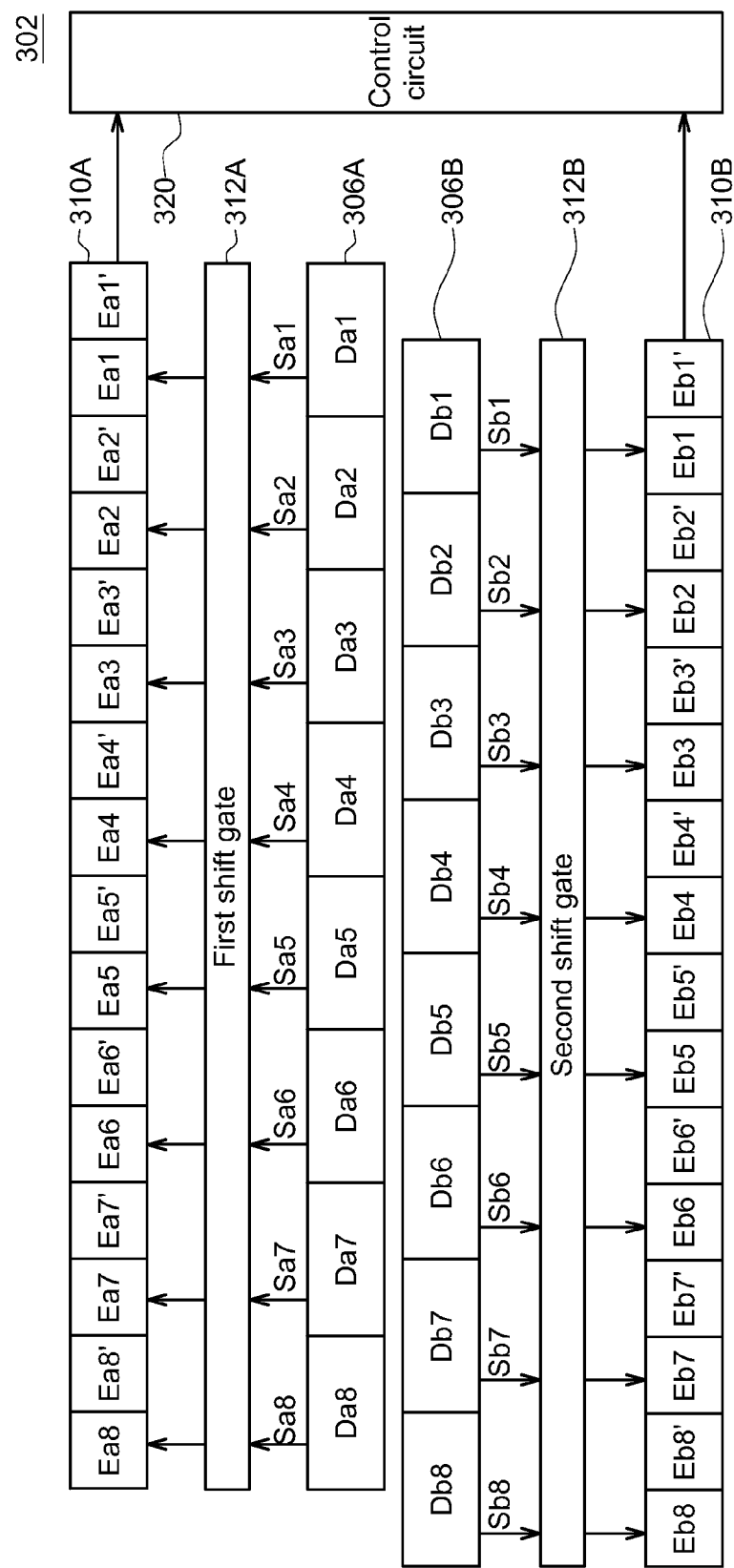
FIG. 3 is a schematic diagram of a staggered type sensing unit module.

Referring to FIG. 3, a schematic diagram of a staggered type sensing unit module is shown. The image sensing device 220 of the invention can be used in a staggered type sensing unit module. As indicated in FIG. 3, the sensing unit module 302 includes a first CCD shift register 310A, a second CCD shift register 310B, a first light sensing unit 306A and a second light sensing unit 306B. Both the first CCD shift register 310A and the second shift register 310B are composed of pleural CCD elements. Let the first shift register 310A be taken for example. The first shift register 310A is composed of pleural first CCD elements Ea and pleural second CCD elements Ea', wherein the first CCD elements Ea and the second CCD element Ea' are staggered with each other. The first sensing unit 306A and the second sensing unit 306B respectively include pleural sensing elements Da and pleural sensing elements Db for receiving first light signals and second light signals (not illustrated in the diagram) and generating corresponding first signal charges Sa and second signal charges Sb. The first and the second signal charges Sa and the second signal charges Sb are controlled by the first shift gate 312A and the second shift gate 312B and outputted to the first CCD elements Ea and the second CCD elements Ea'. The staggered arrangement of the first sensing unit 306A and the second sensing unit 306B can increase the scan resolution in the X-axis direction. Moreover, when the staggered type sensing unit module is used in the invention, at least one set of RCCD, GCCD, and BCCD is added to the sensing unit module 302, such that both the resolution in the Y-axis direction and the exposure capacity can be increased without having to upgrade the specification of the motor or increasing the brightness of the light source.

In the above embodiments, 1 set of red, green, and blue light sensing unit is additionally added to the image sensing device, but the number of additional sets of red, green, and blue light sensing unit is not limited to 1 in the invention. For example, 2 or more sets of red, green, and blue light sensing unit, such as RCCD, RCCD, RCCD, GCCD, GCCD, GCCD, BCCD, BCCD, and BCCD, can be additionally added to the image sensing device. Through proper arrangement of the light sensing units in conjunction with the design of moving the sensing unit module by 1 scan line each time the sensing unit is driven by the step motor to transmit by 1 step, the above object of increasing both the scan resolution and the exposure capacity can also be achieved, and the invention is not limited thereto.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image sensing device disposed on a transmission path of an illumination beam and a plurality of scan lines are performing exposure on a scan document by the illumination beam, and sequentially sensing the scan lines to correspondingly output a plurality of analog signals, comprises:
   N red light sensing units;
   N green light sensing units;
   N blue light sensing units, wherein N≥2; and
   a control circuit used for accumulating an exposure capacity $Q_i$ generated by the $i^{th}$ red light sensing unit, the $i^{th}$ green light sensing unit, and the $i^{th}$ blue light sensing unit in an exposure time Ti and an exposure capacity $Q_{i+1}$ generated by the $(i+1)^{th}$ red light sensing unit, the $(i+1)^{th}$ green light sensing unit, and the $(i+1)^{th}$ blue light sensing unit in the next exposure time $T_{i+1}$ until accumulating an exposure capacity $Q_N$ generated in the $T_N^{th}$ exposure time, wherein i is an positive integer ranging from 1 to N, wherein, the exposure capacities $Q_i$ to $Q_N$ are sequentially stored in a register and outputted from the control circuit, so that an image of each scan line can be sequentially transferred to an analog signal with the sum of the exposure capacities $Q_i$ to $Q_N$.

2. The image sensing device according to claim 1, wherein each of the red, the green, and the blue light sensing units are charge couple devices (CCD) or contact image sensors (CIS).

3. The image sensing device according to claim 1, wherein each of the red, the green, and the blue light sensing units are a time delay integration (TDI) sensors.

4. The image sensing device according to claim 1, wherein the register is a CCD shift register.

5. The image sensing device according to claim 1, wherein the control circuit comprises an adder.

6. The image sensing device according to claim 1, wherein the red, the green, and the blue light sensing units receive the illumination beam and respectively generate corresponding signal charges, which are sequentially controlling for the control circuit to calculate the exposure capacity generated by each of the red, the green, and the blue light sensing units via transferred to the register with a shift gate.

7. The image sensing device according to claim 1, wherein the image sensing device is disposed in a scan module which comprises a motor used for driving the image sensing device or the scan document, so that the image sensing device and the scan document generate relative movement.

8. The image sensing device according to claim 7, wherein when the image sensing device captures an image of the scan document, the N red light sensing units, the N green light sensing units and the N blue light sensing units respectively sense 3N adjacent scan lines of the scan lines at each time of exposure, and each time after the motor of the scan module transmits the image sensing device to relatively move in 1 scan line, the image sensing device, having been relatively moved, continues to sense 3N corresponding adjacent scan lines, and the motor repeatedly transmits the image sensing device to relatively move in 1 scan line until all of the scan lines are sensed.

9. The image sensing device according to claim 8, wherein the scan resolutions of the red, the green, and the blue light sensing units in the direction of movement respectively are N times of the scan resolutions of singular red light sensing unit, singular green light sensing unit, and singular blue light sensing unit in the direction of movement with unchanged motor speed.

10. The image sensing device according to claim 8, wherein total brightness values outputted from the red, the green, and the blue light sensing units respectively are N times of the brightness values outputted from singular red light sensing unit, singular green light sensing unit, and singular blue light sensing unit with unchanged motor speed.

* * * * *